United States Patent [19]

Sheng

[11] 3,931,342
[45] Jan. 6, 1976

[54] PROCESS FOR THE RECOVERY OF GLYCOLS FROM AN AQUEOUS SOLUTION
[75] Inventor: Ming N. Sheng, Cherry Hill, N.J.
[73] Assignee: Atlantic Richfield Company, Los Angeles, Calif.
[22] Filed: May 31, 1974
[21] Appl. No.: 475,340

[52] U.S. Cl..... 260/637 R; 260/462 A; 260/533 R; 260/635 H; 423/279
[51] Int. Cl.$^2$......................................... C07C 27/26
[58] Field of Search..................... 260/635 H, 637 R

[56] References Cited
UNITED STATES PATENTS

| | | | |
|---|---|---|---|
| 2,116,665 | 5/1938 | Brown | 260/637 R |
| 2,389,263 | 11/1945 | Liebmann et al. | 260/637 R |
| 2,916,525 | 12/1959 | Giesen et al. | 260/637 R |
| 3,053,880 | 9/1962 | Dale | 260/637 R |
| 3,483,264 | 12/1969 | Tsao | 260/637 R |

*Primary Examiner*—Joseph E. Evans
*Attorney, Agent, or Firm*—Delbert E. McCaslin

[57] ABSTRACT

A process for the recovery of glycols such as ethylene glycol, propylene glycols, and butylene glycols from an aqueous solution containing a glycol, a dissolved alkali metal borate and osmium compounds comprising coprecipitating the borate and reduced osmium compound from the aqueous solution with water soluble organic solvents, separating the precipitated borate and osmium compound from the solution and recovering the glycol from the remaining water/solvent/glycol solution. The aqueous solutions are derived from the aqueous phase oxidation of an olefin with molecular oxygen in the presence of an octavalent osmium and a borate to prepare the corresponding glycol.

12 Claims, No Drawings

PROCESS FOR THE RECOVERY OF GLYCOLS FROM AN AQUEOUS SOLUTION

BACKGROUND OF THE INVENTION

In a co-pending application of Harold Shalit, Ser. No. 449,889, filed Mar. 11, 1974, entitled OSMIUM CATALYZED OXIDATION OF OLEFINIC COMPOUNDS, there is disclosed a process for the aqueous phase oxidation of $C_2$ to $C_4$ monoolefins to their corresponding glycols with molecular oxygen in the presence of a dissolved octavalent osmium catalyst wherein essentially water soluble borates, particularly the alkali metal borates, are added to the reaction solution to increase the rate of the oxidation reaction and permit higher glycol concentrations to be obtained.

The present invention is directed to a simple and effective method for recovering glycols from an aqueous solution containing a glycol, a dissolved borate and osmium compounds derived, for example, from the process disclosed in the described co-pending application and in addition to recovery of the osmium which is an expensive component of the oxidation reaction.

Attempts were made to recover the glycol and the osmium and borate compounds from the aqueous glycol solution containing the glycol, borate (in the form of borax) and osmium compounds by distillation and steam distillation as well as by solvent extraction, for example, with aniline, carbon tetrachloride, ethyl ether, kerosine, chlorobenzene and fluorobenzene. However, such method did not prove successful.

A number of prior art processes have been proposed for the recovery, separation and purification of glycols from crude aqueous solutions of the glycol or mixtures of glycols which crude mixtures may also contain impurities and/or by products resulting from the manner by which the glycols are produced. such prior art processes generally encompass particular methods of distillation, extraction or absorption and desorption to recover the desired glycol or glycols and include the removal of salts from polyhydric alcohol solutions by the use of ion exchange resins which process is expensive.

U.S. Pat. No. 2,916,525 discloses a method for the absorption of polyhydric alcohols including ethylene glycol and propylene glycol from an aqueous solution by ion exchangers, activated charcoal and kieselguhr which have been treated with a complex-forming substance including borax and thereafter desorbing the alcohols with lower aliphatic monohydric alcohols and their acetic acid esters.

U.S. Pat. No. 3,098,880 discloses a method of recovering $C_{10}$ and $C_{12}$ straight chain glycols from isomeric mixtures containing same by selective solvent extraction with aliphatic, saturated ketones such as acetone and methyl ethyl ketone to precipitate out the straight chain glycol.

U.S. Pat. No. 3,483,264 discloses a process for the purification of polyhydric alcohols by adding cyclohexylamine to a concentrated solution to form a two-phase system, distilling the resulting mixture to remove the azeotropic mixture of water and cyclohexylamine and thereby causing inorganic salts and ash impurities to precipitate. The cyclohhexylamine acts to extract the polyhydric alcohol from solution.

Many important commercial applications have been developed for the $C_2$ to $C_4$ glycols, for example, the glycols are useful in the preparation of medicines, essential oils, alkyd resins, cosmetics and as solvents for food colors and flavoring agents. Thus for many uses it is desirable to obtain a relatively pure material.

SUMMARY OF THE INVENTION

This invention relates to a process for the recovery of glycols from an aqueous solution containing the glycol, a water soluble borate compound and osmium compounds by adding to the aqueous solution a water soluble organic solvent or mixtures of water soluble organic solvents to precipitate out the borate and reduced osmium compound from the aqueous solution in order to recover a relatively pure glycol and the valuable osmium.

In the aforementioned application of Harold Shalit glycols are produced by the aqueous phase oxidation of an olefin with molecular oxygen in the presence of catalytic amounts of dissolved octavalent osmium catalyst and a water soluble borate. Dissolved water soluble osmium catalyst and soluble borate remain as impurities in the final glycol product. In addition, the osmium compounds which may have been reduced to an insoluble $Os^{+4}$ valence state during the oxidation process will remain in the aqueous glycol solution as a fine suspension or colloid and cannot simply be removed by filtration.

It is an object of this invention therefore to provide a process for the recovery and purification of glycols from aqueous solutions containing borate and osmium compounds as impurities.

It is another object of this invention to utilize water soluble solvents or mixtures of water soluble solvents to co-precipitate borate and osmium impurities from aqueous glycol solutions.

It is a further object of this invention to recover the contained osmium values from aqueous glycol solutions produced by osmium catalyzed oxidation of an olefin in the presence of a borate.

These and other objects and advantages of this invention will become apparent from the description of the invention which follows and from the claims.

DESCRIPTION OF THE INVENTION

In order to carry out the process of this invention a glycol having from 2 to 4 carbon atoms in the molecule is produced by the aqueous phase oxidation of a $C_2$ to $C_4$ olefin employing molecular oxygen in the presence of catalytic amounts of osmium, preferably, in the form of dissolved octavalent osmium compounds wherein borates are added to the solution to increase the rate of reaction and permit a higher final glycol concentration to be obtained than is obtained in the absence of the added borate.

To place this invention in its proper context, the overall oxidation reactiion indicated above as is set forth in co-pending application of Harold Shalit, Ser. No. 449,889, filed Mar. 11, 1974, involving the oxidation of an olefin in the presence of a borate and osmium catalyst will also be described and the inter-relation between the oxidation reaction and the process of this invention will be pointed out.

When olefins are caused to react with oxygen in the presence of catalytic amounts of octavalent osmium dissolved in water at a pH of 9 to 11 and at temperatures of 80°C. or above, they form glycols rather selectively, but the rate of reaction is relatively slow and decreases rapidly with time; thus, in a few hours, the reaction is essentially over and the final glycol concentration in solution is relatively low. This is a decided disadvantage since the most expensive component in the system is osmium, and the slower the reaction rate and the lower the final glycol concentration, the greater the amount of osmium that is required to be cycled in the system. Consequently, both osmium inventory as well as make-up are markedly influenced by the reaction rate and final glycol concentration, and therefore, these factors also decidedly influence the economics of the process.

The reason or reasons for the decreasing rate and low final glycol concentration is not known, but it is hypothesized that a complex is formed between the glycol produced and the reduced (hexavalent) osmium, which complex is relatively stable to oxidation. Since the oxidation of the olefin depends upon the octavalent osmium, as this ion becomes depleted and, because of the hypothesized stable hexavalent osmium-glycol complex, is not re-formed, the reaction slows and effectively stops at a relatively low glycol yield. This effect is particularly troublesome since, even at low yields, the glycol is present in a very large molar excess over the osmium, so that the tendency is for the hypothesized $Os^{+6}$-glycol complex to be further stabilized. If borates, in particular the alkali metal borates, are added to the reaction solution, the rate of reaction is materially increased and a considerably higher final glycol concentration is obtained. The reasons for these improvements likewise are not known. It is relatively certain, however, that there is no formation of perborates since sodium perborate fails to reoxidize $Os^{+6}$ to $Os^{+8}$ and in fact decomposes rapidly in the presence of osmium even at low temperatures, i.e. 40°C. and below, well below reaction temperatures.

The olefinic compounds which can be converted to their corresponding glycols and recovered by the method of this invention includes those having from two to four carbon atoms in the molecule, e.g. ethylene, propylene, allyl alcohol (to glycerol), and the butylenes, in particular, isobutylene.

The osmium catalyst is preferably in a water soluble form and is octavalent. These octavalent osmium catalysts are well known in the art, and are conveniently prepared by reacting osmium tetroxide ($OsO_4$) with a small excess of a base such as sodium hydroxide in aqueous solution to produce the active "osmate", i.e. the octavalent osmium salt or salts. Other bases can also be used since the particular "osmate" is not critical. The concentration of osmium in the aqueous solution can vary widely, ranging from 1 part per million to 1 per cent or more. However, as has been pointed out, osmium is a costly material, and accordingly, high concentrations are preferably avoided since they do not give the improvement in results commensurate with their cost. A preferred range of osmium is from 50 ppm to 1000 ppm in the aqueous phase by weight.

The ratio of oxygen to olefinic compound must be outside the explosive limits. If oxygen is in excess, the ratio should be 98 weight per cent oxygen or more and 2 per cent or less of the olefinic compound. At the other end of the range, wherein the olefinic compound is in large excess, the oxygen concentration of the oxidizing gas should be limited to 10 volume per cent oxygen and 90 volume per cent nitrogen (or similar inert gas) irrespective of the amount of olefinic compound. When oxygen is in excess, olefinic compound can be added during the reaction as the reaction proceeds. On the other hand, where the olefinic compound is in excess, oxygen can be added during the reaction as the oxygen is consumed. The reaction can be carried out from pressures ranging from 1 atmosphere to 10,000 psig; however, pressures ranging from about 800 psig to 1200 psig are convenient.

The reaction temperatures ranging from 60° to 200°C. are operable. However, a preferred range is from 80° to 120°C. since above about 120°C. selectivity for the production of the glycol decreases.

It has been found that higher oxygen partial pressures give somewhat higher reaction rates but not significantly higher yields, and likewise, reaction rates increase with temperature, but as has been pointed out, at temperatures above about 120°C. the increase in rate is offset by a loss in selectivity for glycol production. The pH of the aqueous solution can vary from 7 to 14, preferably from 7.5 to 13.5, and most preferably from 8 to 11. This can be adjusted by using a buffer solution or by the use of a combination of boric acid and sodium hydroxide in various proportions. The borate complex resulting is a function of the pH of the solution. Other borates can, of course, be employed, for example, the potassium borates, lithium borate and the like. It is necessary that the compounds be sufficiently water soluble to provide an effective concentration in the aqueous phase. Some borates such as the calcium compounds are relatively only slightly soluble and therefore are not preferred. The perborates are very unstable in the presence of the osmate catalyst and decompose to give the borate with the evolution of the peroxy oxygen. Thus there is no advantage in employing such compounds. It is most preferable to employ borax itself, i.e. $Na_2B_4O_7 \cdot 10H_2O$, since this gives a soution having a pH of about 9.3 which is almost in the middle of the preferred range and is the most common and least expensive borate compound. The amount of borate, for example borax, can range from 1 up to 50 per cent but is preferably from 10 to 40 per cent by weight of the aqueous solution. It has been found that molten borax alone can be used since it provides sufficient water from the molecules of water of hydration to give an aqueous phase. The amount of aqueous solution or aqueous phase need only be sufficient to provide the necessary hydroxyls in the reaction. It is preferred, however, to provide sufficient aqueous phase such that by agitation an efficient contacting of the liquid and gaseous phases is achieved.

The following shows the production of the corresponding glycol from ethylene, propylene and isobutylene by the oxidation process described above which glycols may be recovered and purified by the process of the present invention. The osmium catalyst compound and added borate utilized in the oxidation process remain in the final aqueous glycol product along with minor amounts of other by-products such as sodium acetate and aldehydes.

The reactions were carried out with the olefinic compound and oxygen in a stirred titanium autoclave, 300 cc capacity, at below the lower explosive limit, i.e., 98+per cent molecular oxygen and about 1.1 per cent by weight olefin. The total pressure in the bomb was 900 psig, the olefin was added in increments as it was reacted as shown by pressure decrease. The additional increments were added in such a manner that the explosive concentration was not exceeded. In each reaction there was used 150 cc of an aqueous solution of octavalent osmium catalyst prepared from a small molar excess of sodium hydroxide and osmium tetroxide, such that the solution contained by analysis 710 ppm by weight of osmium.

The following reactions were carried out in the manner described giving the results shown below.

| Olefin | Ethylene | Propylene | Isobutylene |
|---|---|---|---|
| Borax, Wt. % | 25 | 25 | 25 |
| Temperature, °C. | 100 | 100 | 100 |
| Time, hours | 3 | 3.5 | 5 |
| Glycol yield, grams | 6.9 | 8.2 | 43.6 |
| Hydroxyisobutyric acid, grams | 0 | 0 | 10.1 |
| Rate, grams glycol/hour | 2.30 | 2.34 | 8.74 |

In accordance with the present invention, a crude aqueous glycol solution, as, for example, the aqueous glycol solution obtained by the above described processes, and comprising glycol, water, a borate and osmium compound, is subjected to a treatment with a suitable water soluble organic solvent to co-precipitate the borate and reduced osmium compounds from the solution; the borate and osmium compound are separated from the solution by any suitable means such as by filtering or centrifuging leaving a mixture of essentially water, glycol and solvent. The water and solvent may be separated from the mixture by any appropriate means, such as by distilling off the water and solvent and the remaining essentially pure glycol recovered. By precipitating and removing the borate from the solution the equilibrium reaction in accordance with the following:

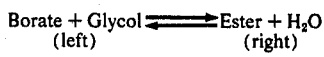
$$\text{Borate} + \text{Glycol} \rightleftharpoons \text{Ester} + H_2O$$
(left) (right)

shifts to the left freeing the glycol from the borate ester and thus remains in the aqueous solution. The glycol separation and the recovery can be carried out batchwise or continuously in conjunction with the oxidation reaction. Thus, the reduced water insoluble tetravalent osmium salt ($Os^{+4}$) precipitated with the borate is recovered and may be reoxidized to the water soluble octavalent ($Os^{+8}$) form and recycled together with the recovered borate for further use in the oxidation reaction to prepare the glycol. The solvent utilized to co-precipitate the borate and osmium may be recovered for reuse, for example, during the distillation step to separate and recover the glycol.

In the osmium catalyzed oxidation process to produce the corresponding glycol such as propylene to propylene glycol, there is produced minor amounts of acetic acid as a by-product which in the presence of an added alkali metal borate such as borax, form, for example, the metal salt of acetic acid, sodium acetate. It has been found that by the process of the present invention the borate and osmium compound co-precipitate leaving the sodium acetate in the remaining glycol-water-solvent solution. Thus, the sodium acetate can be recovered as a crystalline residue upon distillation of the solution for the final recovery of the glycol.

An essential feature of this invention is the co-precipitation of the osmium compound, which must be in a reduced $Os^{+4}$ state, and the borate. The product crude aqueous glycol solution prepared by the osmium tetroxide catalyzed oxidation of an olefin may contain osmium compounds in the soluble octavalent ($OsO_4$), soluble reduced hexavalent ($OsO_3$) and insoluble tetravalent ($OsO_2$) state. The concentration of osmium in the aqueous glycol solution will depend on the amount of the octavalent osmium catalyst used in the aqueous phase oxidation reaction to produce the corresponding glycol. Thus, the amount of osmium in the aqueous glycol solution can vary widely, and can range from 1 part per million to 1 per cent or more. Since osmium is a costly material the amount used in the oxidation reaction and therefore the amount of osmium in the final aqueous glycol solution will generally range from 50 to 1000 ppm by weight.

If the soluble osmium compounds are not reduced to an insoluble $Os^{+4}$ valency they will remain in solution. As noted hereinabove the reduced $Os^{+4}$ valence osmium will remain in the aqueous glycol solution as a fine suspension or colloid and alone cannot be adequately removed by filtration. Involved and complicated process steps would be necessary for such removal. However, in the present process the reduced osmium compound are co-precipitated with the borate and thus are in a filterable form and readily recoverable.

It is known that $OsO_2$ is insoluble in water and can be oxidized to its higher soluble oxidation state by hydrogen peroxide and many other oxidizing agents. It has been found according to the present invention that the soluble $Os^{+8}$ and $Os^{+6}$ valence osmium compounds can be reduced in the presence of an aqueous solution of glycol such as propylene glycol to the insoluble $Os^{+4}$ valence state by heating the solution at reflux temperatures of from 90° to 100°C. The osmium must be in the aqueous glycol solution in order to effectively reduce the osmium to the $Os^{+4}$ valence state by heating. It has also been found that the addition of hydrogen or sodium borohydride to the heated glycol solution at reflux temperatures greatly aids in the further reduction of the $Os^{+8}$ to $Os^{+4}$ to give higher recovery of the osmium compound when co-precipitated with the borate upon the addition of the water soluble organic solvent.

The amount of water soluble borate in the aqueous glycol solution will depend on the amount of borate added to the oxidation reaction solution. Thus, the amount of borate in the aqueous glycol solution, for example borax, can range from 1 up to 50 per cent but will generally be from 10 to 40 per cent by weight of the aqueous glycol solution.

The water soluble organic solvents which can be used in the process of this invention for the co-precipitation of the borate and osmium compound from the aqueous glycol solution permitting recovery of an essentially pure glycol are preferably the lower boiling water soluble organic solvents.

Solvents having boiling points close to the boiling point of the $C_2$ to $C_4$ glycol being recovered are to be avoided due to the attendant problem of separating the glycol from the final glycol-water-solvent mixture. The $C_2$ to $C_4$ glycols recovered by the process of this invention have boiling points in the range of 188° to 206°C. with glycerol boiling at 290°C.

Thus, the glycols, which in certain processes are utilized as solvents, cannot be used in the present process. In addition, the glycols facilitate the formation of the borate ester which are soluble in water and are not precipitated. The addition of a glycol will shift the equilibrium reaction, noted hereinabove, to the right and the borate along with the osmium cannot be precipitated.

Solvents which may form a complex with the borate compound such as amine solvents are also to be avoided. Amines are known to be a poison for osmium catalyzed oxidation reactions and therefore the borate-osmium precipitate containing even very minor amounts of amine could not be recovered and recycled to the oxidation reaction without extensive purification. Amines also react with borates to form amides which may also be soluble in the solution and may not be precipitated.

Water soluble organic solvents having boiling points well above the boiling point of the glycol being recovered are suitable for use in this process. Bis[2-(2-methoxyethoxy)-ethyl] ether suitable for use in the present invention has a reported b.p. of 275.8°C.

Suitable water soluble organic solvents for use in accordance with the present invention include ketones, such as acetone; monohydric alcohols, such as methanol, ethanol, t-butanol, isopropanol and n-propanol, aliphatic ethers, such as methyl ether ether and bis[2-(2-methoxyethoxy)ethyl] ether; cyclic ethers such as dioxane and tetrahydrofuran and alkyl nitriles, such as acetonitrile and propionitrile. For economic reasons acetone is the preferred solvent. The solvents alone or a mixture of the solvents may be used. Partially water soluble organic solvents such as methyl ethyl ketone (37 per cent solubility in 100 parts water) may also be used in admixture with other water soluble organic solvents so long as the solvent mixture is infinitely water soluble. Thus, for example, it has been determined that a mixture of acetone and methyl ethyl ketone can be used if the acetone is in the range of from 50 weight per cent to 90 weight per cent of the amount of the two solvents.

Generally 20 per cent and up to 100 per cent by volume of the water soluble organic solvent based on the volume of aqueous glycol solution is added to the crude aqueous glycol solution to precipitate the borate and osmium compounds. Larger amounts of solvent may be employed, for example, greater than 100 per cent by volume based on the volume of the aqueous glycol solution but is avoided since there is no apparent improvement in results, and accordingly, the addition of excess solvent would only necessitate the burdensome recovery of a large volume of solvent during the final distillation of water and solvent to recover the essentially pure glycol.

The water soluble solvents are generally added to the crude aqueous glycol solution at room temperature although slightly lower or higher temperatures of the glycol solution can be tolerated. At higher temperatures the boiling point of the solvent used is such that there is no loss of solvent by vaporization at the higher temperatures.

Although the process of the present invention will be directed to the treatment and recovery of propylene glycol from a crude aqueous propylene glycol solution containing a borax and osmium compound, it is not intended that the process be limited to such glycol solution and those skilled in the art will recognize that the present process is broadly applicable to the treatment and recovery of other crude glycols such as ethylene glycol, butylene glycols, etc. having 2 to 4 carbon atoms which have been prepared by the osmium catalytic oxidation of an olefin in the presence of a borate as described hereinabove.

The following Examples are provided to illustrate the recovery of a glycol in accordance with the principles of this invention but are not to be construed as limiting the invention in anyway except as indicated by the appended claims.

EXAMPLE I

A number of runs were made using various water soluble organic solvents to precipitate borax from a prepared solution of propylene glycol, borax and water. The solution was heated in a round bottom flask equipped with a water condenser and magnetic stirrer at 90°C. for 30 minutes. After this period the borax had completely dissolved in the solution which was poured into an Erlenmeyer flask. 100 ml of water soluble organic solvent was added to the solution at room temperature and left overnight. Large crystals precipitated out from the solutions and were filtered and washed with a small amount of acetone. The crystals melted between 77°–79°C. (melting point of $Na_2B_4O_7 \cdot 10H_2O$ is 75°C.). In each run essentially 100 per cent of the charged propylene glycol remained in the water-solvent-glycol solution. The results are shown in Table I.

TABLE I

| | Precipitation of Borax Charge: 15 g. propylene glycol, 25 g. purified borax and 85 g. $H_2O$ | | |
|---|---|---|---|
| Run No. | Org. Solvent (ml.) | Precipitant, g. | % Recovery of Borax |
| 1 | Acetone, 100 | 21.7 | 86.8 |
| 2 | Acetone, 50 + MEK, 50 | 21.8 | 87.2 |
| 3 | Tertiary butyl alcohol, 100 | 21.1 | 84.4 |
| 4 | Tertiary butyl alcohol, 100 | 19.9 | 79.6[1] |
| 5 | Tetrahydrofuran, 100 | 21.5 | 86.0 |
| 6 | Dioxane, 100 | 13.5[2] | 54.0 |
| 7 | Bis[2-(2 methoxy-ethoxy)-ethyl]ether, 100 | 19.0[2] | 76.0 |
| 8 | Acetone, 100 | 22.6 | 90.4[3] |
| 9 | Acetone, 10 ml | 22.6 | 90.1[4] |

[1]10 g propylene glycol, 25 g of borax and 90 g $H_2O$ were used in the charge.
[2]M.P.: > 130°C. (due possibly to borate having less than 10 mols of $H_2O$.
[3]This experiment was carried out first using no organic solvent. No precipitant was observed after the charge solution was left at room temperature overnight. Acetone (100 ml) was then added into this solution and immediately, crystalline borax starts to precipitate out.
[4]5 g propylene glycol, 25 g of borax and 40 g $H_2O$ were used in the charge. This run indicates that a concentrated solution requires less solvent to precipitate the borax.

EXAMPLE II

A run was made according to the procedures of Example I except that the prepared solution charged consisted of 15 gms. propylene glycol, 25 gms. purified borax and 40 gms. of water. 20 ml. of acetone was used to precipitate out the borax and the solution filtered. The separation of the borax and propylene glycol was almost complete. 98 per cent of the charged borax was accounted for in the precipitant (24.4 g.) and 97 per cent of the charged proylene glycol remained in the final solution and is recovered by distilling off the acetone and water.

EXAMPLE III

A number of runs were made using 20 ml acetone as the solvent to co-precipitate borax and reduced $Os^{+4}$ osmium compound from a prepared solution of propylene glycol, borax, water and an osmium tetroxide ($OsO_4$) solution containing 855 parts per million osmium. The solutions were heated at 90°C., the reflux temperature of the solution, to reduce the soluble osmium compound to an $Os^{+4}$ valence insoluble state, cooled to room temperature and the acetone added. The co-precipitated borax and osmium were separated by filtration. In run number 1, 87.8 per cent of the osmium co-precipitated out with the borax with 12.2 per cent of the osmium remaining in the solution due to incomplete reduction. The addition of hydrogen (Run No. 2) and sodium borohydride (Run No. 3) to the solution during heating at reflux further reduced the soluble osmium to the insoluble $Os^{+4}$ valence state and gave higher recovery of the osmium. In each run essentially 100 per cent of the charged propylene glycol remained in the water-solvent-glycol solution and was recovered by distilling off the acetone and water.

The results are shown in Table II.

TABLE II

Precipitation of Borax and Osmium
Charge: 15 g PG, 25 g purified borax and 40 ml $H_2O$/Os solution, 855 ppm Os

| Run No. | Conditions | Precipitant, g | (1) Filtrate, g, (Os) | % of the charged Os in Precipitant |
|---|---|---|---|---|
| 1 | Heated at 90°C. for 1½ hours | 22.9 | 52.2 (80 ppm) | 87.8 |
| 2 | Heated at 90°C. for 2 hours with $H_2$ bubbling into the solution | 21.7 | 62.6 (53 ppm) | 90.3 |
| 3 | Heated at 90°C. for 10 min. Into this solution, 0.5 g of $NaBH_4$ was added and the solution was heated for additional 10 min. | 24.4 | 48.8 (53 ppm) | 92.4 |

(1) 20 ml of acetone were used to precipitate the borax and the Os.

EXAMPLE IV

A run was made according to the procedures of Example I except that the prepared solution charged consisted of 15 grams propylene glycol, 25 grams purified borax, 45 grams of water and 1 gram of sodium acetate. 20 ml. of acetone was used to precipitate out the borax (22.6 gram precipitant with 90.6 per cent borax recovery) and the solution filtered. NMR analysis showed that 90 per cent of the charged sodium acetate remined in the water-solvent-glycol solution and was recovered as a crystalline residue by distillation of the solution to recover the glycol.

I claim:

1. A process for the recovery of glycols or glycerol having from 2 to 4 carbon atoms in the molecule from an aqueous solution containing said glycol or glycerol, a dissolved borate and osmium compounds derived from the aqueous phase oxidation of a $C_2$–$C_4$ olefinic compound selected from the group consisting of ethylene, propylene, allyl alcohol and butylene with molecular oxygen in the presence of an octavalent osmium catalyst and an alkali metal borate which comprises the steps of:

adding to the aqueous solution at least one water soluble organic solvent selected from the group consisting of lower alkanones, lower alkanols, lower alkyl ethers and cyclic ethers containing only carbon, hydrogen and oxygen, and lower alkyl nitriles to co-precipitate borate and reduced osmium compounds from said solution;

separating the precipitated borate and osmium compounds from said solution to form a water-solvent-glycol mixture containing a minor amount of an alkali metal acetate; and distilling said mixture to separate water and solvent and recovering the desired glycol or glycerol.

2. A process according to claim 1 wherein the solvent is a mixture of water soluble organic solvents.

3. A process according to claim 2 wherein one of the solvents is acetone and the other solvent is methyl ethyl ketone and the acetone ranges from 50 weight per cent to 90 weight per cent of the amount of the two solvents.

4. A process according to claim 1 wherein said precipitated borate and osmium compounds are separated by filtration or centrifugation to form a water-solvent-glycol mixture containing a minor amount of an alkali metal acetate.

5. A process according to claim 1 wherein the borate is borax having the molecular formula $Na_2B_4O_7 \cdot 10H_2O$.

6. A process according to claim 1 wherein soluble osmium compound contained in the aqueous solution is reduced to a water insoluble $Os^{+4}$ tetravalent state prior to coprecipitation with the borate.

7. A process according to claim 6 wherein the aqueous solution is heated at reflux temperature to reduce soluble osmium compound to a water insoluble $Os^{+4}$ tetravalent state.

8. A process according to claim 2 wherein hydrogen is bubbled into the heated aqueous solution to aid in the reduction of the soluble osmium compound to said water insoluble state.

9. A process according to claim 7 wherein sodium borohydride is added to the heated aqueous solution to aid in the reduction of the soluble osmium compound to said water insoluble state.

10. A process according to claim 1 wherein the aqueous solution contains propylene glycol, dissolved borax and a reduced osmium compound and acetone is added to said aqueous solution to co-precipitate said borate and osmium compounds from said solution.

11. A process according to claim 1 wherein following the distilling to separate water and solvent, the solution of glycol or glycerol is distilled for final recovery of glycol or glycerol.

12. A method according to claim 1 wherein the alkali metal borate is selected from the group consisting of sodium, potassium and lithium borates.

* * * * *

UNITED STATES PATENT OFFICE
CERTIFICATE OF CORRECTION

PATENT NO. : 3,931,342
DATED : January 6, 1976
INVENTOR(S) : Ming N. Sheng

It is certified that error appears in the above-identified patent and that said Letters Patent are hereby corrected as shown below:

Column 10, Claim 8, line 63 should read:

"A process according to Claim 7...."

Instead of:

--A process according to Claim 2--

Signed and Sealed this thirtieth Day of March 1976

[SEAL]

Attest:

RUTH C. MASON
*Attesting Officer*

C. MARSHALL DANN
*Commissioner of Patents and Trademarks*